United States Patent [19]

Yeh

[11] Patent Number: 5,586,650

[45] Date of Patent: Dec. 24, 1996

[54] CD BANK

[76] Inventor: Sheng-Fu Yeh, P.O. Box 82-144, Taipei, Taiwan

[21] Appl. No.: 654,587

[22] Filed: May 29, 1996

Related U.S. Application Data

[63] Continuation-in-part of Ser. No. 632,585, Apr. 15, 1996.

[51] Int. Cl.$^6$ ..................................... B65D 85/57
[52] U.S. Cl. ........................ 206/308.1; 206/309; 206/425
[58] Field of Search ................................ 206/308.1, 309, 206/312, 425; 211/40, 41; 312/9.42, 9.48; 220/532, 533

[56] References Cited

U.S. PATENT DOCUMENTS

| | | | |
|---|---|---|---|
| 4,640,416 | 2/1987 | Northrup et al. | 206/425 |
| 4,778,047 | 10/1988 | Lay | 206/309 |
| 4,781,292 | 11/1988 | Sacherman et al. | 206/309 |
| 4,875,743 | 10/1989 | Gelardi et al. | 206/308.1 |
| 5,027,950 | 7/1991 | Gutierrez et al. | 206/425 |
| 5,176,250 | 1/1993 | Cheng | 206/308.1 |
| 5,201,414 | 4/1993 | Kaszubinski | 206/308.1 |
| 5,322,162 | 6/1994 | Melk | 206/308.1 |
| 5,443,160 | 8/1995 | Tortorella et al. | 206/425 |
| 5,547,078 | 8/1996 | Iida | 206/308.1 |

*Primary Examiner*—David T. Fidei
*Attorney, Agent, or Firm*—Alfred Lei

[57] ABSTRACT

A CD bank which includes a case, a transparent cover hinged to the case, and a plurality of individual CD holder plates mounted inside the case to hold individual compact disks respectively, wherein the case has two longitudinal rails bilaterally disposed on the inside, and longitudinally spaced pairs of transverse grooves respectively made on the longitudinal rails; the individual CD holder plates are respectively pivotably mounted in the longitudinally spaced pairs of transverse grooves between the longitudinal rails, each individual CD holder plate having a half-round recess for holding an individual compact disk, an extension board extending from the diameter of the half-round recess, an opening at the periphery of said half-round recess for the insertion of the thumb, an index groove at the extension board for mounting an index sticker, a plurality of retaining lugs suspending above the half-round recess and spaced around the border thereof for holding down an individual compact disk within the half-round recess, and two springy rods respectively raised from two opposite ends of the bottom side thereof and pivoted to one pair of the longitudinally spaced pairs of transverse grooves.

1 Claim, 4 Drawing Sheets

5,586,650

CD BANK

CROSS-REFERENCE

This application is a continuation-in-part of the pending patent application Ser. No. 08/632,585, filed Apr. 15, 1996.

BACKGROUND OF THE INVENTION

1. Field of the Invention

This invention relates to a CD bank for keeping compact disks in good order, and relates more particularly to such a CD bank which comprises a case, and a set of individual CD holder plates arranged inside the case for keeping individual compact disks.

2. Description of the Prior Art

Various CD storage cases and racks have been disclosed for keeping compact disks, and have appeared on the market. These CD storage means are designed to hold individual CD packages, but not individual compact disks. When to play an individual compact disk, one shall have to pick up the respective individual CD package from the CD storage means, and then to open the individual CD package so as to pick up the desired individual compact disk.

SUMMARY OF THE INVENTION

This invention relates to a CD bank for keeping compact disks in good order, and relates more particularly to such a CD bank which comprises a case, and a set of individual CD holder plates arranged inside the case for keeping individual compact disks.

It is the main object of the present invention to provide a CD bank which has individual holder means to hold individual compact disks so that individual compact disks can be stored in the CD bank without an individual packing case. According to the preferred embodiment of the present invention, the CD bank comprises a case, a transparent cover hinged to the case, and a plurality of individual CD holder plates mounted inside the case to hold individual compact disks respectively, wherein the case has two longitudinal rails bilaterally disposed on the inside, and longitudinally spaced pairs of transverse grooves respectively made on the longitudinal rails; the individual CD holder plates are respectively pivotably mounted in the longitudinally spaced pairs of transverse grooves between the longitudinal rails, each individual CD holder plate having a half-round recess for holding an individual compact disk, an extension board extending from the diameter of the half-round recess, an opening at the periphery of said half-round recess for the insertion of the thumb, an index groove at the extension board for mounting an index sticker, a plurality of retaining lugs suspending above the half-round recess and spaced around the border thereof for holding down an individual compact disk within the half-round recess, and two springy rods respectively raised from two opposite ends of the bottom side thereof and pivoted to one pair of the longitudinally spaced pairs of transverse grooves.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
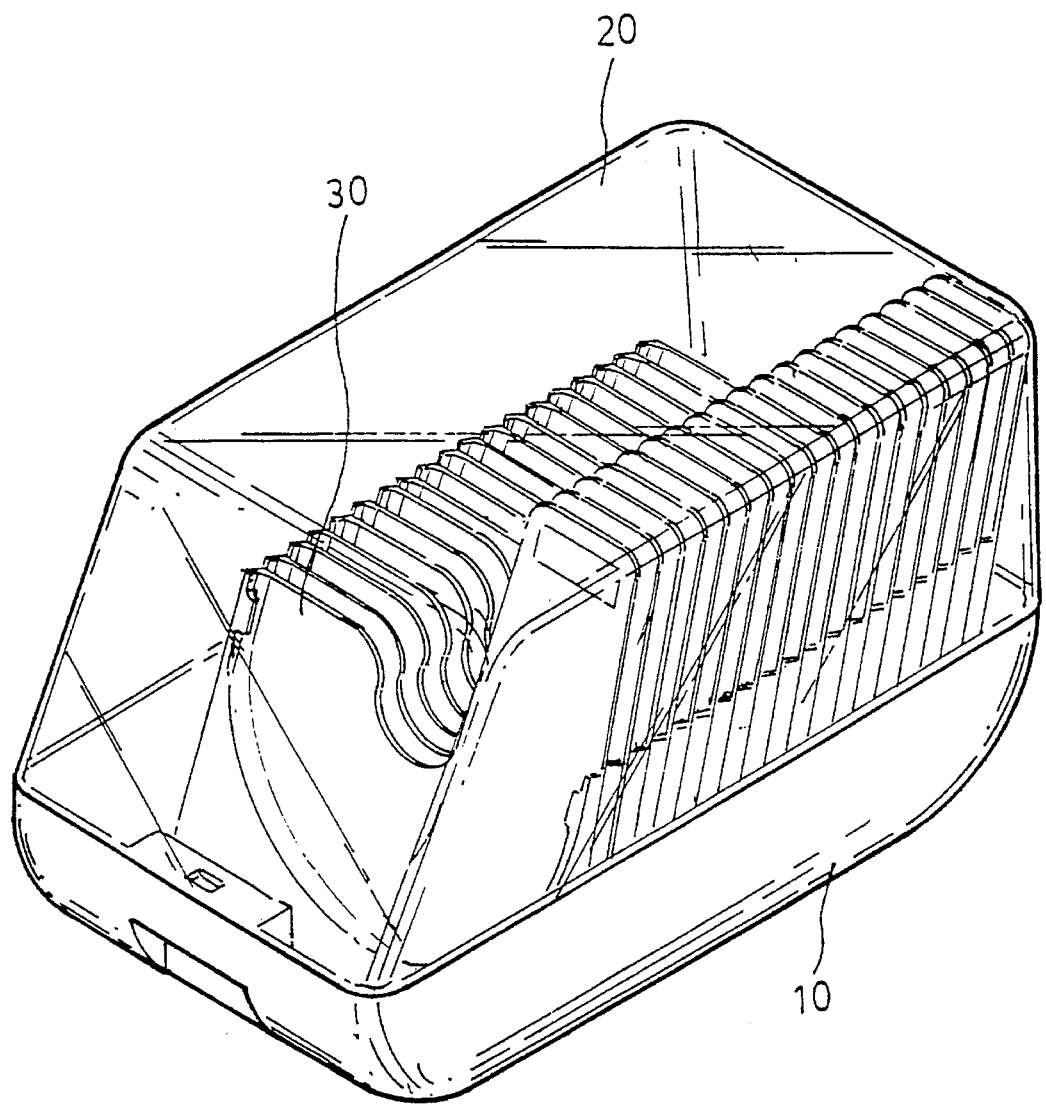
FIG. 1 is an elevational view of a CD bank according to the preferred embodiment of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
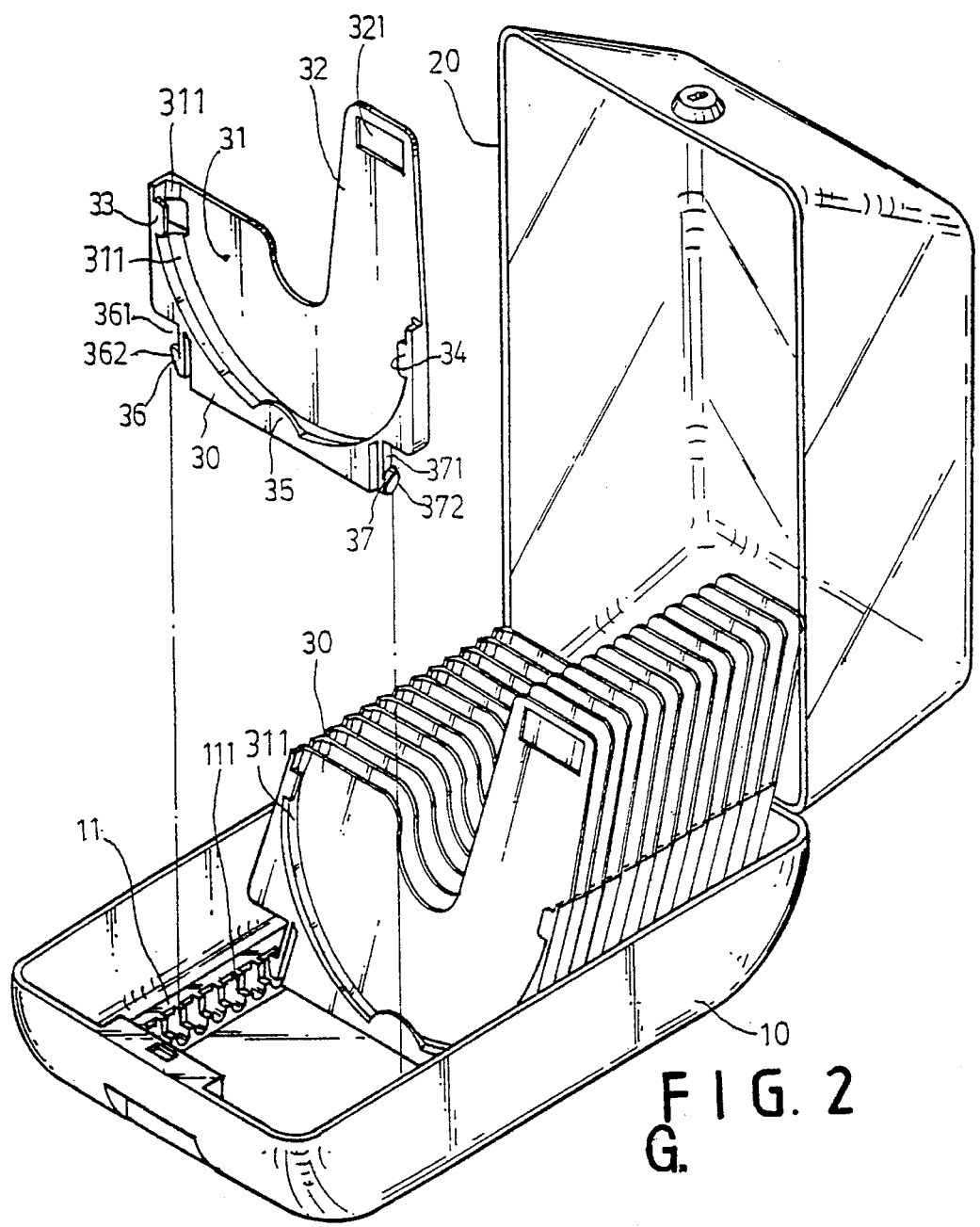
FIG. 2 shows the CD bank of FIG. 1 opened, and one individual CD holder plate detached.
Figure 2A:
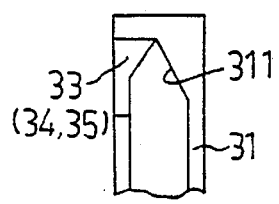
FIG. 2A is an enlarged fragmentary view of FIG. 2.
Figure 3:
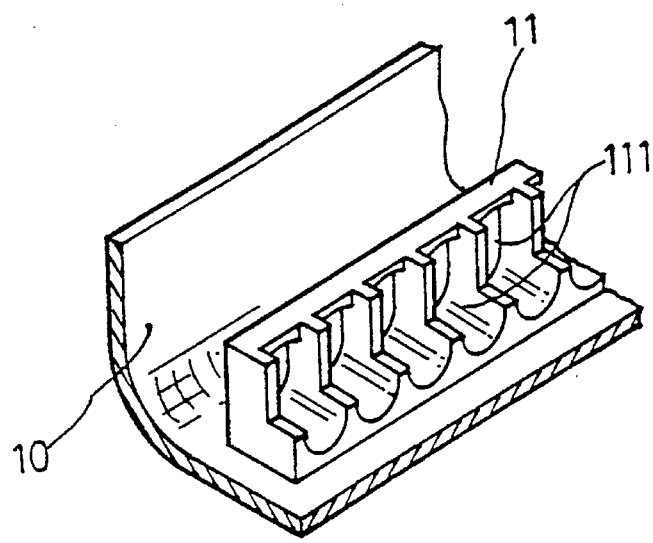
FIG. 3 is a partial view in an enlarged scale of the case of the CD bank shown in FIG. 1, showing the structure of the longitudinal rail and the transverse grooves in the longitudinal rail.
Figure 4:
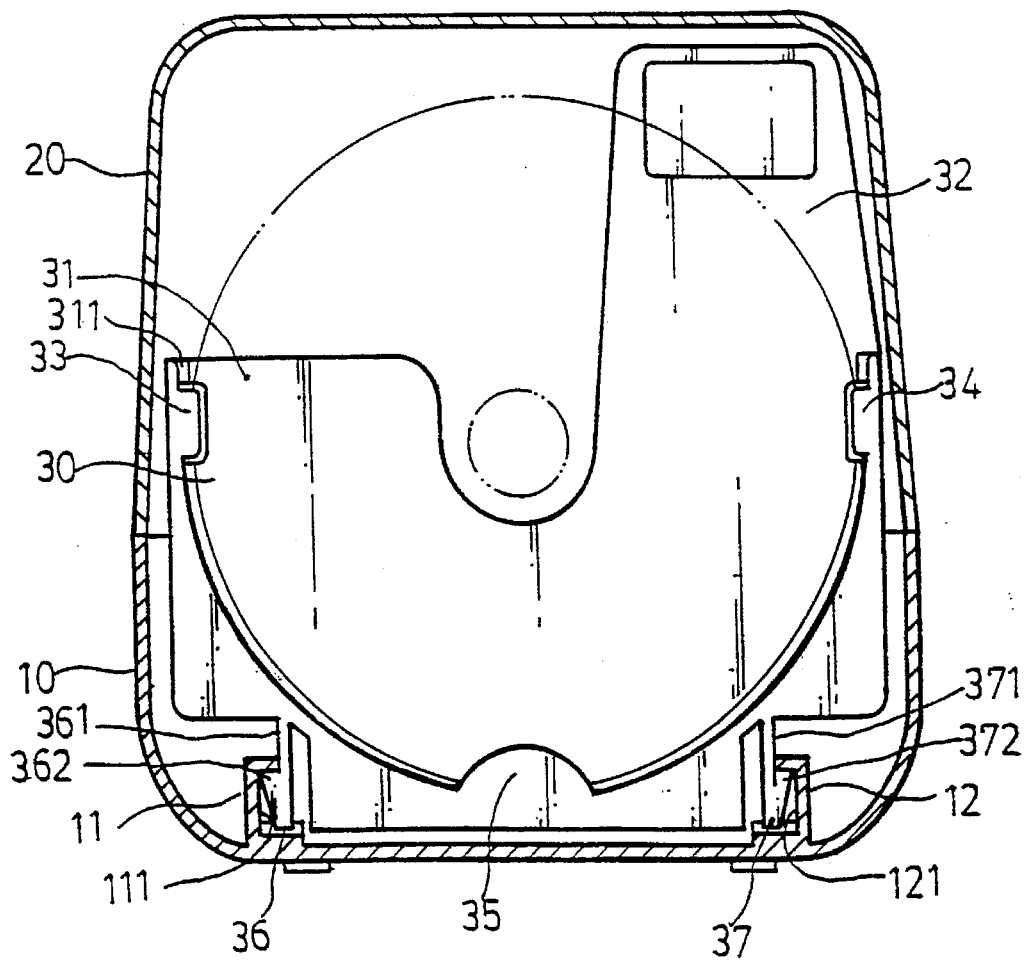
FIG. 4 is a sectional end view in an enlarged scale of the CD bank shown in FIG. 1.
Figure 5:
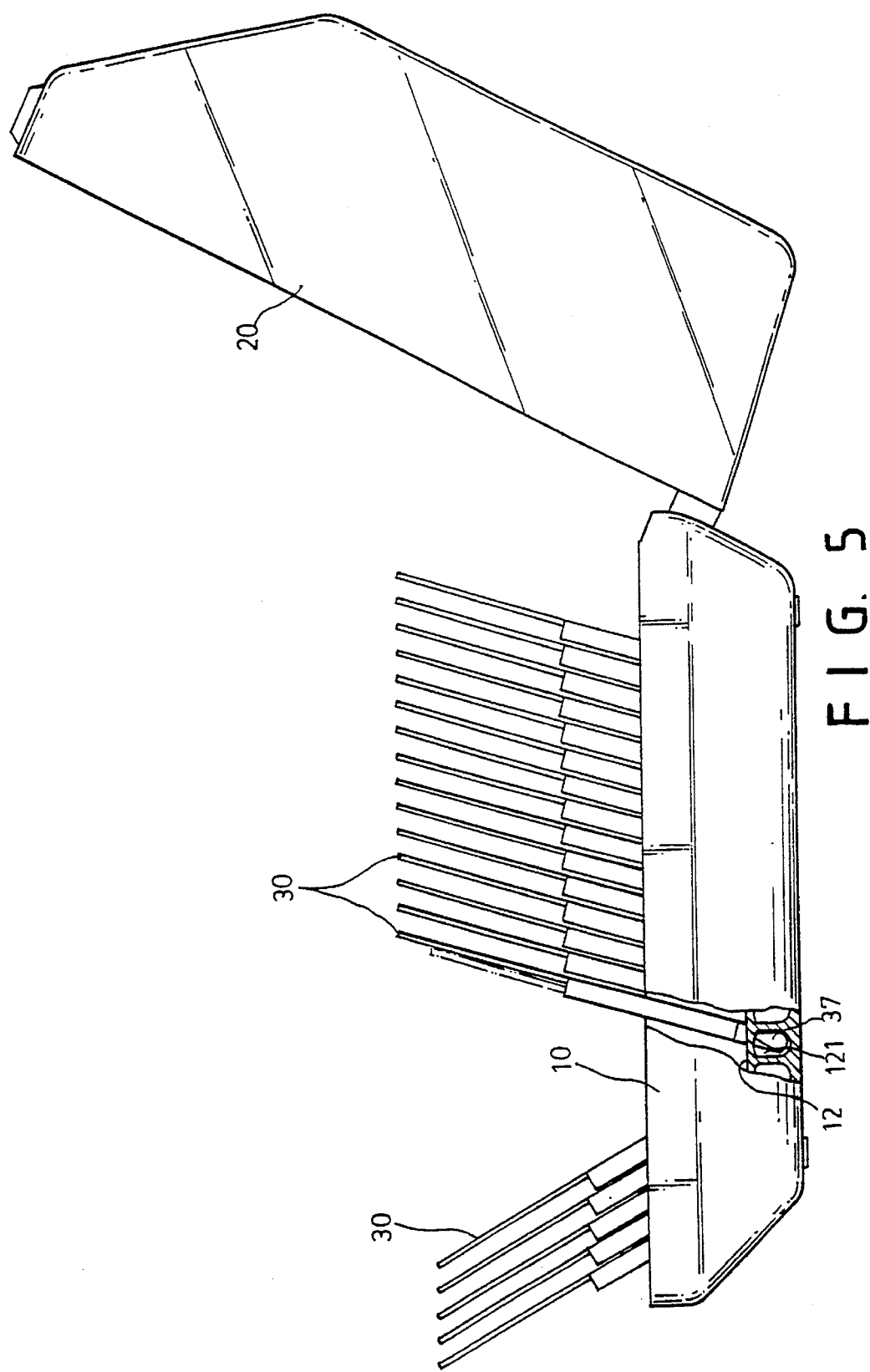
FIG. 5 is a side plain view in an enlarged scale of the CD bank shown in FIG. 1.

Referring to FIGS. 1, 2 and 2A, a CD bank in accordance with the present invention is generally comprised of a case 10, a cover 20 hinged to the rear side of the case 10, and a plurality of individual CD holder plates 30 transversely mounted inside the case 10 and arranged in a line. The case 10 is a substantially rectangular container having an open top side, two longitudinal rails 11, 12 bilaterally and symmetrically disposed on the inside (see also FIG. 4). Each of the longitudinal rails 11, 12 has a plurality of longitudinally spaced transverse grooves 111 or 121. The cover 20 is molded from transparent material fitting over the casing 10, having a rear side hinged to the rear short side of the casing 10 and a front side mounted with a lock for locking in the closed position when covered on the casing 10. The individual CD holder plates 30 are respectively pivotably connected to the transverse grooves 111, 121 between the longitudinal rails 11, 12 and turned about a respective pivot.

Referring to FIGS. 2A, 3, 4, and 5, the transverse grooves 111, 121 of the longitudinal rails 11, 12 of the case 10 are symmetrically arranged in pair. Preferably, each of the transverse grooves 111, 121 has an inner end terminating in a blind hole adapted to hold a pivot or the like, and the bottom side of each of the transverse grooves 111, 121 is smoothly curved inwards to diminish resisting force between there spective transverse groove and the object being inserted therein. Each of the individual CD holder plates 30 comprises a half-round recess 31 of diameter slightly longer than that of an individual compact disk and having a beveled edge 311, an arched opening at the periphery of the half-round recess 31 for the insertion of the thumb to load an individual compact disk onto the half-round recess 31 or to pick up an individual compact disk from the half-round recess 31, an extension board 32 extending outwards from the half-round recess 31 at one side, an index groove 321 at the extension board 32 for mounting an index sticker, a plurality of retaining lugs 33, 34 and 35 suspending above the half-round recess 31 and spaced around the periphery and having a beveled edge opposite to the beveled edge 311 of the half-round recess 31 thereby enabling a compact disk to be kept between the bevel edge of the lugs 33, 34 and 35 and the beveled edge 311 of the half-round recess 31 and therefore preventing the compact disk from being scratched and damaged by the CD holder plates 30, two springy rods 36, 37 bilaterally disposed at a bottom side thereof. Each of the springy rods 36, 37 has a suspension rod section 361 or 371 downwardly suspended from the individual CD holder plate 30, and a pivot rod section 362 or 372 outwardly extending from the end of the suspension rod section 361 or 371. By forcing the pivot rod sections 362, 372 of the spring rods 36, 37 of the individual CD holder plates 30 into engagement with the transverse grooves 111, 121, the individual CD holder plates 30 are pivotably connected between the longitudinal rails 11, 12 inside the case 10 and arranged in a line.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A CD bank comprising a case, a transparent cover hinged to said case, and a plurality of individual CD holder plates mounted inside said case to hold individual compact disks respectively, wherein said case comprises two longitudinal rails bilaterally disposed on the inside, and longitudinally spaced pairs of transverse grooves respectively made on said longitudinal rails; said individual CD holder plates are respectively pivotably mounted in said longitudinally spaced pairs of transverse grooves between said longitudinal rails, each individual CD holder plate comprising a top side, a bottom side, a half-round recess defined between said top side and said bottom side for holding an individual compact disk, an arched opening at the periphery of said half-round recess for the insertion of the thumb, an extension board extending from said top side at one side of said arched opening, an index groove at said extension board for mounting an index sticker, a plurality of retaining lugs suspending above said half-round recess and spaced around the border thereof for holding down an individual compact disk within said half-round recess, and two springy rods respectively raised from said bottom side at two opposite ends and pivoted to one pair of said longitudinally spaced pairs of transverse grooves, each transverse groove of said longitudinally spaced pairs of transverse grooves having an inner end terminating in a blind hole adapted to hold one springy rod of one individual CD holder plate, and a bottom side smoothly curved inwards, each of the springy rod of each of said individual CD holder plates including a suspension rod section downwardly suspended from the respective individual CD holder plate, and a pivot rod section outwardly extending from said suspension rod section and turned in the blind hole of the respective transverse groove, said half-round recess has a first beveled edge and said retaining lugs being each formed with a second beveled edge opposite to said first beveled edge thereby enabling a compact disk can be therebetween and therefore preventing said compact disk from being scratched and damaged by said CD holder plates.

* * * * *